(12) United States Patent
Hong et al.

(10) Patent No.: US 10,839,054 B2
(45) Date of Patent: Nov. 17, 2020

(54) TERMINAL AND METHOD FOR CHECKING CALIBRATION HISTORY OF SCALE AND SYSTEM FOR MANAGING CALIBRATION HISTORY OF SCALE

(71) Applicant: CAS CORPORATION, Yangju-si (KR)

(72) Inventors: Yi Phyo Hong, Seoul (KR); Kwan Ho Tho, Yangju-si (KR); Deok Hyun Kim, Yangju-si (KR); Hee Chun Jung, Yangju-si (KR); Byung Hoon Lee, Uijeongbu-si (KR)

(73) Assignee: CAS CORPORATION, Yangju-si (KR)

( * ) Notice: Subject to any disclaimer, the term of this patent is extended or adjusted under 35 U.S.C. 154(b) by 727 days.

(21) Appl. No.: 14/381,729

(22) PCT Filed: Jul. 1, 2013

(86) PCT No.: PCT/KR2013/005817
§ 371 (c)(1),
(2) Date: Aug. 28, 2014

(87) PCT Pub. No.: WO2014/003511
PCT Pub. Date: Jan. 3, 2014

(65) Prior Publication Data
US 2015/0101038 A1  Apr. 9, 2015

(30) Foreign Application Priority Data

Jun. 29, 2012 (KR) .................. 10-2012-0071301
Jul. 1, 2013 (KR) .................. 10-2013-0076300

(51) Int. Cl.
*G06F 21/31* (2013.01)
*G06F 21/62* (2013.01)
*H04L 29/06* (2006.01)

(52) U.S. Cl.
CPC .......... *G06F 21/31* (2013.01); *G06F 21/6227* (2013.01); *H04L 63/107* (2013.01); *G06F 2221/2153* (2013.01)

(58) Field of Classification Search
None
See application file for complete search history.

(56) References Cited

U.S. PATENT DOCUMENTS 3,066,752 A * 12/1962 Spademan ............. G01G 3/145
                                                            177/211
6,431,446 B1 * 8/2002 Gu ........................... G01J 3/28
                                                            235/454

(Continued)

FOREIGN PATENT DOCUMENTS

| CN | 101303253 | 11/2008 |
|---|---|---|
| JP | 7-18739 | 3/1995 |

(Continued)

OTHER PUBLICATIONS

New Oxford American Dictionary (3 ed.) Edited by Angus Stevenson and Christine A. Lindberg, Oxford University Press, Print Publication date 2010, current online version 2015, 1 page (Year: 2015).*

(Continued)

*Primary Examiner* — James D Nigh
(74) *Attorney, Agent, or Firm* — Novick, Kim & Lee, PLLC; Jae Youn Kim; Jihun Kim (57) ABSTRACT

The present invention relates to a terminal for checking a calibration history of a scale, a system for managing a calibration history of a scale and a method of checking a calibration history of a scale, and more particularly, a terminal for managing history of calibrating or revising the reference data being a standard when calculating a weight, the system thereof and the method thereof. According to the present invention, it is expected to prevent business trans- (Continued)

actions of a scale user because a general user as well as a qualified person can determine whether a scale is manipulated without authority. In addition, according to the system of the present invention, it is possible to greatly lower the calibration cost of a scale.

8 Claims, 4 Drawing Sheets

(56) References Cited

U.S. PATENT DOCUMENTS

| | | | | |
|---|---|---|---|---|
| 2007/0192715 A1* | 8/2007 | Kataria | ............... | G06Q 10/06 |
| | | | | 715/764 |
| 2009/0119051 A1* | 5/2009 | Murray | ............... | G01G 17/06 |
| | | | | 702/101 |
| 2011/0021188 A1* | 1/2011 | Tanaka | ............... | G01G 23/3735 |
| | | | | 455/426.1 |
| 2013/0030931 A1* | 1/2013 | Moshfeghi | ............. | G01S 5/021 |
| | | | | 705/16 |
| 2013/0256040 A1* | 10/2013 | Nybom | ................ | G01G 19/40 |
| | | | | 177/1 |

FOREIGN PATENT DOCUMENTS

| | | |
|---|---|---|
| JP | 2006-284412 | 10/2006 |
| JP | 2010-211257 | 9/2010 |
| KR | 10-0851412 | 8/2008 |

OTHER PUBLICATIONS

International Search Report for International Application No. PCT/KR2013/005817, dated Sep. 4, 2013.

* cited by examiner

TERMINAL AND METHOD FOR CHECKING CALIBRATION HISTORY OF SCALE AND SYSTEM FOR MANAGING CALIBRATION HISTORY OF SCALE

FIELD OF THE INVENTION

The present invention relates to a terminal and a method for checking a calibration history of a scale and a system for managing a calibration history of a scale, and more particularly, a terminal, system and method for managing history of calibrating or revising reference data, a standard in a weight calculation.

BACKGROUND OF THE INVENTION

According to Weights and Measures Act, scales and thermometers must be verified in weighing and measuring and should be calibrated through periodic or non-periodic inspections.

Generally, in periodic or non-periodic inspections, an inspector checks with the naked eye whether seals of the scale have been damaged. If the seals are not damaged, it can be judged that a proper management of the scales has been made. As next steps, calibration is performed and a timer reset is made so as to count to the next inspection time and to notify reaching of time.

The cases of obtaining unfair profit by an illegal manipulation of a meter have continuously occurred, and particularly an illegal manipulation of mechanical scales is constantly uncovered. Recently, a case of manipulating the volume of refueling with a remote controller has been uncovered.

The Chinese government substituted mechanical scales with electronic scales in all commerce in order to prevent a damage generated by a manipulation of mechanical scales, and tried to establish a fair commercial environment by installing the electronic scales in the 'standard market' across China since 2000. However, an illegal manipulation of the electronic scales recently reoccurred and no obvious solution to settle this problem has come up so far.

European electronic scale companies assign a secret code to a person in charge of inspection or calibration to access and to calibrate a scale in need of calibration. In this case, only authorized persons can access to inside a scale, thereby preventing manipulation of the scale to some extent. However, it cannot be a proper way to handle various manipulation methods and cannot provide a solution to judge whether the current set values of the scale are manipulated based on the calibration history of the scale, since the scale is calibrated based on the state of the scale only according to this method.

To summarize, any proper way of detecting an act of cheating on the gradation of the scale has not been suggested even though various ways, such as, sealing scales, inspecting and calibrating the scale periodically, have been tried.

SUMMARY OF THE INVENTION

Therefore, the present invention aims to provide a system for managing a calibration history of a scale, the system being capable of detecting unauthorized manipulation of the scale, thereby preventing unauthorized manipulation of the scale and establishing a fair business transaction environment.

The above objects may be achieved by a system for managing a calibration history of a scale, the system comprising: a scale including a weight measuring unit for measuring and calculating a load weight, a memory storing reference data and identification information of the scale, the reference data being a standard when calculating a weight, and a communication unit for transmitting and receiving data to/from external device; a management server including a storage storing the identification information of the scale and the most recently calibrated reference data of the scale, and a transceiver capable of transmitting and receiving data to/from external device; and a mobile terminal including a communication module for communicating with the scale and the management server, and a history checking unit for checking whether an unauthorized manipulation of the reference data has occurred, wherein the history checking unit receives the identification information and the reference data from the scale through the communication module, requests the most recently calibrated reference data of the scale to the management server based on the identification information, receives the most recently calibrated reference data from the management server, and determines whether the reference data received from the scale has been manipulated without authorization according to the consistency of the reference data received from the scale and the most recently calibrated reference data received from the management server.

Here, upon a revision of the reference data resulting from a calibration of the scale, the history checking unit may transmit revised reference data along with the identification information of the scale to the management server, and the management server may store the revised reference data into the storage.

In addition, the history checking unit may be activated by an authentication process based on user information, and the history checking unit may create location information of the scale by receiving the location information of the scale from one of the scale, a GPS module and a user to transmit the location information to the management server. And, the scale further may comprise a real-time clock; and a timer for receiving time information from the real-time clock, storing calibration time information into the memory, and checking whether a predetermined upcoming calibration time is reached based on the calibration time information.

The above objects may be also achieved by a terminal for checking a calibration history of a scale, the terminal comprising: a communication module for communicating with an external device; and a history checking unit which receives a reference data being a standard when calculating a weight from checked scale through the communication module, receives the most recently calibrated reference data of the checked scale from a management server, compares the reference data from the checked scale and the most recently calibrated reference data from the management server, and determines whether the reference data received from the scale has been manipulated without authorization according to the consistency of the reference data received from the scale and the most recently calibrated reference data received from the management server.

Here, the history checking unit may receive identification information from the checked scale, transmit it to the management server and receive the most recently calibrated reference data of the checked scale corresponding to the identification information. And the terminal may further comprise a user authentication unit for authenticating a user; and a location information checking unit for creating a location information of the checked scale, wherein the history checking unit may be activated after the user authentication unit authenticates the user, and transmit the location information of the scale checked by the location information checking unit to the management server.

The above objects may be also achieved by a method of checking a calibration history of a scale, the method comprising: storing an identification information of a checked scale and the reference data being a standard when calculating a weight into the checked scale and a management server; performing user authentication; receiving the identification information through communication with the checked scale when the user authentication has been successful; transmitting the identification information to the management server; receiving the most recently calibrated reference data of the scale corresponding to the identification information from the management server; receiving the reference data from the checked scale, the reference data which has been stored in the checked scale and used to calculate weight; comparing the reference data received from the checked scale and the most recently calibrated reference data received from the management server; and determining that the scale has been manipulated without authorization if the reference data received from the checked scale was not identical to the most recently calibrated reference data received from the management server.

According to the present invention, general users as well as an authorized user can easily determine whether a scale is manipulated without authorization, which can lead to an expectation of preventing unfair business transactions of scale users.

In addition, according to an embodiment of the present system, it is possible to greatly lower the calibration cost of a scale.

DETAILED DESCRIPTION

Hereinafter, an embodiment of the present invention will be described in detail with reference to the drawings attached.

Figure 1:
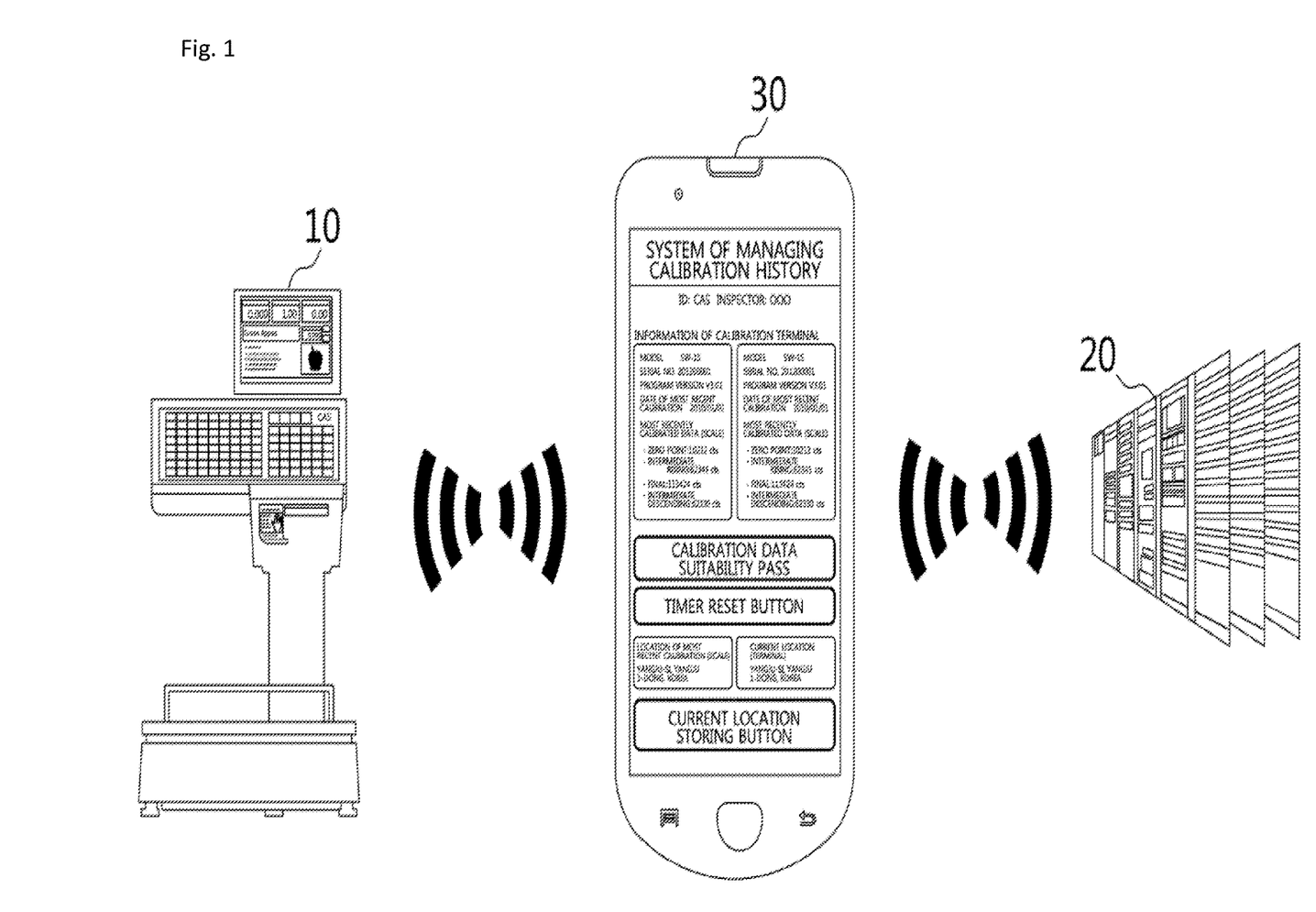
FIG. 1 is a schematic diagram of a management system of a scale calibration history according to an embodiment of the present invention.
Figure 2:
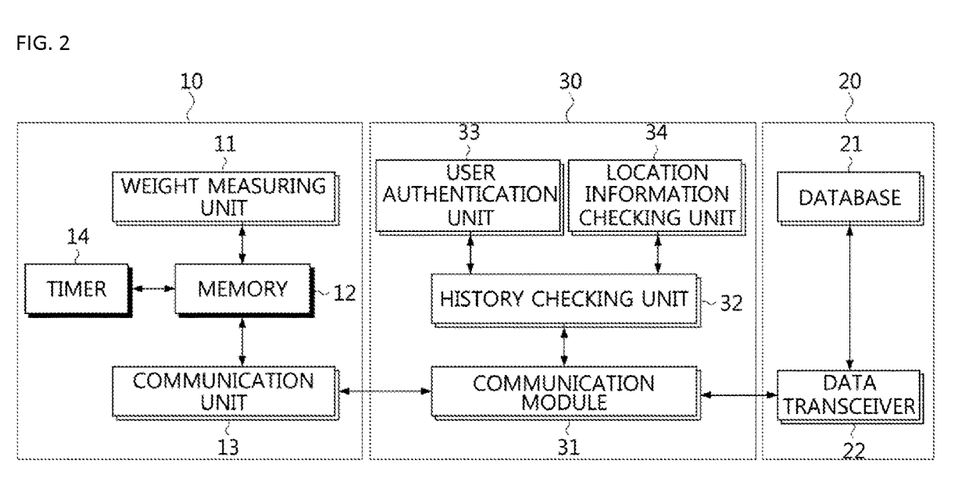
FIG. 2 is a schematic block diagram of means configuring the management system of a scale calibration history of FIG. 1.

FIG. 1 is a schematic diagram of a management system of a scale calibration history according to an embodiment of the present invention, and FIG. 2 is a schematic block diagram of means for configuring a management system of a scale calibration history of FIG. 1.

Referring to FIGS. 1 and 2, a management system of a scale calibration history according to an embodiment of the present invention comprises a scale 10, a management server 20, and a terminal 30 for checking a scale calibration history.

The scale 10 includes a weight measuring unit 11, a memory 12, a communication unit 13 and a timer 14.

The weight measuring unit 11 can be configured as a normal means of the scale used to measure and calculate a load weight, and typically includes a load cell, a pressing means for pressing the load cell in proportion to a load weight, a strain gage installed for converting deformation amount of the load cell derived from pressure into an electric signal, a peripheral circuits, etc. The scale according to an embodiment of the present invention 10 is not limited in its way of measuring a load weight to a particular method nor in its type to a particular type. Therefore, the present invention applies to all scales that can store specific data for calculating a weight and calculate a load weight according to the stored data as described below.

The memory 12 is used to store the identification information of the scale including the data being a standard when calculating a weight (hereinafter, 'reference data').

The reference data can be defined in many different ways depending on a manufacturer and a measurement method of the scale 10. For example, an electronic scale sets, as zero-point data, a certain electrical potential at the input terminal with no load when a current flows through a bridge circuit including a strain gage and sets, as an intermediate rising data, an electrical potential at the input terminal with a load of half the full weight capacity of the electronic scale. Furthermore, the electronic scale sets, as a final data, an electrical potential at the input terminal with a load of the full weight capacity of the electronic scale, and sets as an intermediate descending data an electronic potential at the input terminal with a load of half the full weight capacity of the electronic scale again, thereby storing the four data as reference data into the memory 12.

The manufacturer manufactures the scale 10, measures the reference data when calibrating the scale, stores the reference data into the memory 12, and releases the scale 10. When measuring a load weight is carried out with the scale, the magnitude of the electrical potential of an input terminal that is measured in the same conditions is linearly compared with the reference data and is converted to a load weight. The above operation principle of the scale is very common, but however, an embodiment of the present invention is not limited to the above-described operation principle. The scope of the present invention includes the concept of specifying the reference data, a standard in a weight calculation, comparing data corresponding to a certain load to the reference data, and estimating the weight of the load backwards.

The identification information of the scale 10 is a unique code for identifying the scale 10, and can be implemented with the manufacturer, manufacturing serial number, etc.

The communication unit 13 transmits and receives data to/from an external device, and there is no particular limitation regarding a means for communication. For example, any communication means, such as a wired/wireless communication system, a local area communication system, various protocols, etc., is available and it is more desirable to utilize a communication method, such as WiFi, NFC, Bluetooth, infrared communications, etc, which a specialized person or a general user can easily use.

The timer 14 receives time information from a real-time clock (RTC), stores calibration time information into the memory 12, and checks whether a predetermined upcoming calibration time is reached based on the calibration time information.

The management server 20 is configured to include a database 21 for storing the most recently calibrated reference data of each scale 10 corresponding to the identification information of each scale 10 and a transceiver 22 capable of transmitting and receiving data to/from an external device.

According to a preferred embodiment of the present invention, the database 21 includes information about all scales 10 that are subject to management. By storing the reference data and the calibration time of the scales calibrated through an official calibration procedure for all the scales 10 in need of periodic examinations, it is possible to check unintended manipulation of the reference data by an unauthorized user with a simple comparison.

In addition, it is desirable to store, into the database 21, the information about where the scale 10 was most recently calibrated or inspected, or where the scale 10 is used.

It is because the inspector himself/herself can visit the user in time so as to inspect the scale 10 in case a user of the scale 10 does not visit an inspection office for a periodical inspection, as well as because an easy incorporation of inspections on the scales 10 located in a neighboring area can be induced.

A data transceiver 22 can include a wireless communication protocol capable of remotely communicating with an external device, for example 3G, LTE, etc., and a communication module capable of using a wired communication network, for example an internet.

The terminal 30 for checking a calibration history of a scale comprises a history checking unit 32 for comparing the reference data of the scale 10 and the reference data managed by the management server 20, a user authentication unit 33, and a location information checking unit 34, along with a communication module 31 for communicating with the scale 10 and/or the management server 20.

The history checking unit 32 requests and receives the identification information and the reference data from the scale 10 to be checked, transmits the identification information to the management server 20, and receives the most recently calibrated or checked reference data through an official procedure. Furthermore, the history checking unit 32 determines whether the user arbitrarily or illegally manipulates the scale or not, based on the consistency of the reference data received from the scale 10 and the reference data received from the management server 20. Regardless of the determination, when the reference data is revised according to the calibration of the scale 10, the history checking unit 32 transmits the reference data revised by the calibration and the identification information of the scale 10 to the management server 20 so as to let the management server 20 update the database 21.

The user authentication unit 33 is configured to limit the right to access to the terminal 30 or to the scale 10 to be checked and thus, can be implemented in a way that an authenticated user, for example, an inspector from an inspection agency needs to input an authorized ID and a password for access. The terminal 30 for checking a calibration of a scale according to an embodiment of the present invention can be developed in a form of a dedicated terminal, and can be implemented as an application equipped in a universal portable terminal such as a PDA and a smart phone. As described above, only an authorized person may be allowed to use the scale through an authentication process, but however, the present invention is not limited to the example described above. According to another embodiment of the present invention, a general user may use a smart phone and applications thereof so as to check the fairness of the scale 10. The checking unit of the location information 34 directly or indirectly specifies the location of the scale 10 for an effective management of the scale 10.

The location of the scale 10 can be schematically specified by a GPS module (not shown) equipped on the terminal 30, a GPS module equipped on the scale 10, or a location information from adjacent base stations. Furthermore, the location information may be obtained by a user of the terminal 30 manually inputting the location of the scale 10.

Therefore, the checking unit 34 of the location information can be implemented to have a GPS module, a module for capturing data from an external device, a keypad, etc. The obtained location information is now transmitted to the management server 20 to be stored into the database 21.

Figure 3:
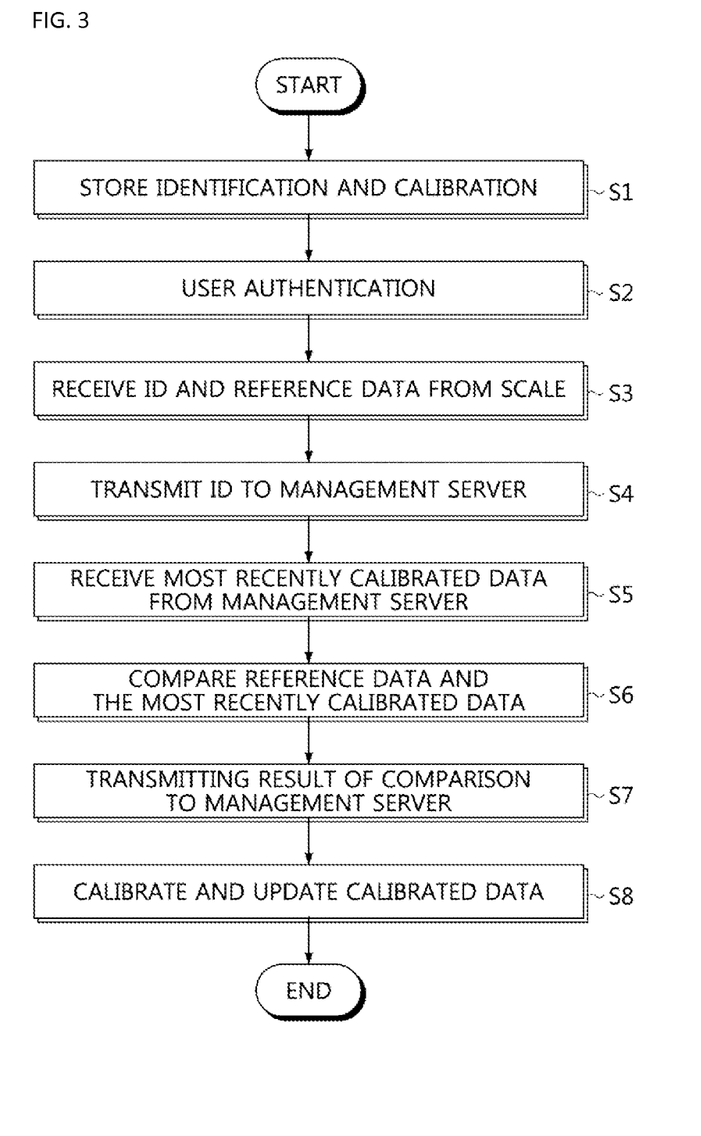
FIG. 3 is a flowchart of a checking method of a scale calibration history according to an embodiment of the present invention.

FIG. 3 is a flowchart for a checking method of a calibration history of a scale according to an embodiment of the present invention. Hereinafter, the operation of a system for managing a calibration history of a scale according to an embodiment of the present invention shown in FIGS. 1 and 2 will be explained with a reference to FIG. 3.

First, the method of checking a calibration history of a scale according to an embodiment of the present invention is based upon the premise that a step S1 of storing the identification information of the scale 10 and officially calibrated reference data both into the memory 12 inside the scale 10 and into the database 21 of the management server 20 precedes.

Then, in step S2, a terminal user goes through an authentication procedure using a user authentication unit 33.

If the authentication procedure is successful, the terminal user activates the history checking unit 32 and receives the identification information and the reference data through a communication with the scale 10 to be checked in step S3.

The history checking unit 32 transmits the identification information to the management server 20 via the communication module 31 in step S4 and the management server 20 returns the reference data of the scale 10 corresponding to the identification information in step S5.

The history checking unit 32 compares the reference data received from the scale 10 and the reference data received from the management server 20, and determines the consistency of the two reference data in step S6.

If it turns out as a result of comparison that the reference data received from the checked scale 10 is not identical to the reference data received from the management server 20, it can be determined that the scale 10 has been manipulated without authorization, whereas if the reference data received from the scale 10 is identical to the reference data received from the management server 20, it can be determined that the scale 10 has not been manipulated without authorization.

According to the present invention described above, it is possible to easily check whether the scale 10 is manipulated without authorization by checking the real calibration history of the reference data without checking a state of a sealing inside the scale 10 with the naked eye.

The result of scale verification can be notified to the management server 20 and/or a related organization in step S7.

In the next step S8, the user may calibrate the scale 10, thereby revising the reference data, for example, the zero point data, the intermediate rising data, the final data, and the intermediate descending data, and the history checking unit 32 transmits the revised data on calibration to the management server 20.

Then, the management server 20 updates the reference data corresponding to the identification information.

In addition, the terminal user sets the calibration date or inspection date as new initial date of a start point for counting to the next inspection date, and this information may be updated by a timer reset of the scale 10 and/or the next inspection date of the scale 10 supplied by the management server 20. The location information of the scale 10 obtained from the location information checking unit 34 may be transmitted to the management server 20 and be stored or updated on the database 21.

Figure 4:
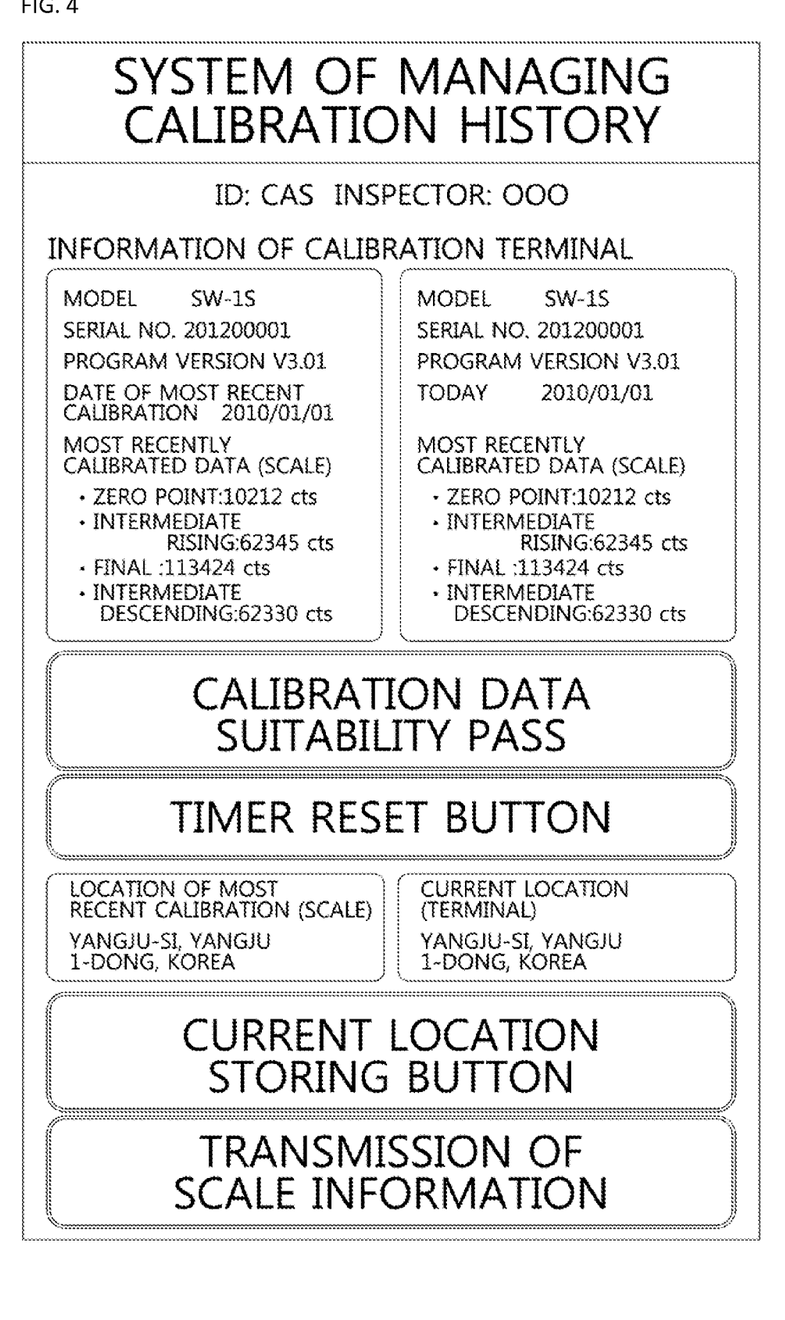
FIG. 4 is a display screen of a history checking unit of a terminal of checking a scale calibration history according to an embodiment of the present invention.

FIG. 4 is a display screen corresponding to the history checking unit 32 of a terminal for checking a calibration history of a scale 30 according to an embodiment of the present invention.

In the upper left box of FIG. 4, the identification information of the scale 10 obtained from the management server 20, a model and a serial number as identification information, the zero point, the intermediate rising data, the final data, and the intermediate descending data which are the most recently calibrated reference data, at Jan. 1, 2010, are displayed and the reference data is presented in units of count (cts) reflecting a quantization level.

Somehow, in the upper right box of FIG. 4, the identification information of the scale 10 obtained from the scale 10 is displayed and the most recently calibrated zero point data, intermediate rising data, final data, and intermediated descending data which are the reference data currently stored on the memory of the scale 12 are presented in units of count.

If the two reference data, displayed in FIG. 4, that are most recently calibrated are identical, the calibration data can be acknowledged to be proper. That is, it is determined that the user has not manipulated the scale 10 without authorization.

Somehow, the terminal user may press any of selection buttons displayed on a touch screen to separately perform each of the desired functions.

In FIG. 4, upon input of a timer 14 reset, the internal timer 14 of the scale 10 can be reset and the very same information may be transmitted to the management server 20. Furthermore, upon selection of a button for storing a current location, the current location of the terminal 30 may be transmitted to the management server 20, and in case that the reference data stored in internal memory 12 is changed by a new calibration of the scale, the information may be transmitted to the database 21 to be stored by a selection of a button for scale information transmission.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

For example, the history checking unit 32 of the above embodiment may determine whether the scale is manipulated without authorization according to the comparison and the consistency of the two reference data, but however, there can be another embodiment as shown in FIG. 4 that includes simply displaying the reference data received from both of the scale and the management server, checking the consistency of the two reference data by the terminal user's naked eye, and pressing a PASS button for representing a suitability of calibration data as a way of judgment.

In addition, it is possible to transmit all information of the scale 10 obtained from the scale 10 to the management server 20, to let the management server 20 take all the judgment procedures, and to transmit the result of judgment to the terminal 30.

Furthermore, another embodiment is possible that allows a general user to check only the result of determination without displaying the reference data and not allowing approach to internal information of the scale 10.

Therefore, embodiments of the present invention are only to be understood as illustrative, the technical spirit of the present invention is defined in the claims, and the scope of which is defined in the appended claims and their equivalents.

What is claimed is:

1. A system for managing a calibration history of an electronic scale, the system comprising:

the scale including a memory, a transmitter and a receiver, wherein:

said memory is configured to store reference data and identification information of the scale, the reference data being one or more standard electrical potentials at an input terminal of the scale and used for calculating a weight, and said transmitter and receiver are configured, in part, to transmit and receive data to and from an external device, respectively;

a management server including a transceiver configured, in part, to transmit/receive data to/from an external device, the management server configured, in part, to receive from the scale the reference data and the identification information of the scale, via the transceiver, and store the identification information of the scale and the reference data, which is most recently calibrated reference data of the scale; and a terminal including:

at least one receiver and at least one transmitter configured, in part, to communicate with an external device, at least one memory, at least one processor including program code for an application, and a display screen, wherein the at least one transmitter, the at least one receiver, the at least one memory, the display screen and the program code are configured, with the at least one processor, to cause the terminal to perform, at least, the following:

receive the identification information and the reference data from the scale, request the most recently calibrated reference data of the scale to the management server based on the identification information received from the scale, receive the most recently calibrated reference data from the management server, and compare the most recently calibrated reference data of the scale received from the management server and the reference data currently stored in and received from the scale, determine that the scale has not been manipulated when the reference data received from the scale and the most recently calibrated reference data received from the management server are identical to each other, notify the management server that the scale has been verified, based on the determination that the scale has not been manipulated, revise the reference data comprising zero-point data, intermediate rising data, final data, and intermediate descending data as part of a scale calibration, transmit the revised calibration data to the management server, and receive from the management server a timer reset and/or next inspection date of the scale.

2. The system according to claim 1, wherein, upon a revision of the reference data resulting from a calibration of the scale, the terminal is further caused to:

transmit revised reference data along with the identification information of the scale to the management server to store the revised reference data.

3. The system according to claim 1, wherein the terminal is further caused to:
  authenticate a user by requiring the user to input an authorized ID and a password, prior to receiving the identification information and the reference data from the scale.

4. The system according to claim 1, the scale further comprising:
  a real-time clock; and
  a timer;
  wherein the timer is configured to receive time information from the real-time clock, store calibration time information into the memory, and check whether a predetermined upcoming calibration time is reached based on the calibration time information.

5. A terminal for checking a calibration history of an electronic scale, the terminal comprising:
  at least one transmitter and at least one receiver configured, in part, to communicate with an external device;
  at least one memory and at least one processor including program code for an application; and
  a display screen,
  wherein the at least one transmitter, the at least one receiver, the at least one memory, the display screen, and the program code are configured to, with the at least one processor, cause the terminal to perform at least the following:
  receive, from the scale, a reference data, said reference data being one or more standard electrical potentials at an input terminal of the scale and used for calculating a weight,
  receive the most recently calibrated reference data of the scale from a management server,
  compare the reference data currently stored in and received from the scale and the most recently calibrated reference data received from the management server,
  determine that the scale has not been manipulated when the reference data received from the scale and the most recently calibrated reference data received from the management server are identical to each other,
  notify the management server that the scale has been verified, based on the determination that the scale has not been manipulated,
  revise the reference data comprising zero-point data, intermediate rising data, final data, and intermediate descending data as part of a scale calibration,
  transmit the revised calibration data to the management server, and
  receive from the management server a timer reset and/or next inspection date of the scale.

6. The terminal according to claim 5, wherein the terminal is further caused to:
  receive identification information from the scale, transmit it to the management server and receive the most recently calibrated reference data of the scale corresponding to the identification information.

7. The terminal according to claim 5, wherein the terminal is further caused to:
  require a user to input an authorized ID and a password to authenticate a user,
  wherein, after the user is authenticated, transmit the location information of the scale to the management server.

8. A method of checking a calibration history of an electronic scale, the method comprising:
  storing identification information of the scale and reference data, said reference data being one or more standard electrical potentials at an input terminal of the scale and used for calculating a weight;
  performing user authentication by requiring a user to input an authorized ID and a password;
  receiving the identification information through communication with the scale when the user authentication has been successful;
  transmitting the identification information to a management server;
  receiving the most recently calibrated reference data of the scale corresponding to the identification information from the management server;
  receiving the reference data from the scale;
  comparing the reference data currently stored in and received from the scale and the most recently calibrated reference data received from the management server;
  determining that the scale has not been manipulated when the reference data received from the scale and the most recently calibrated reference data received from the management server are identical to each other;
  notifying the management server that the scale has been verified, based on the determination that the scale has not been manipulated;
  revising the reference data comprising zero-point data, intermediate rising data, final data, and intermediate descending data as part of a scale calibration;
  transmitting the revised calibration data to the management server; and
  receiving from the management server a timer reset and/or next inspection date of the scale.

* * * * *